3,002,034
PROCESS FOR PRODUCING DIARYL PARAFFINS
Johann Gustav David Schulz, Pittsburgh, Pa., assignor to Gulf Research & Development Company, Pittsburgh, Pa., a corporation of Delaware
No Drawing. Filed Dec. 17, 1958, Ser. No. 780,927
4 Claims. (Cl. 260—668)

This invention relates to a process for producing diaryl paraffins, more particularly to a process for condensing an aryl compound with an aliphatic organic compound having a carbonyl group selected from the group consisting of aldehydes and ketones, preferably aldehydes. By "aliphatic organic compound" I mean to include a straight or branched chain structure containing the carbonyl group; a saturated or unsaturated ring structure having a branched or straight chain substituent with the carbonyl group attached to said substituent; a saturated ring structure with the carbonyl group directly attached to the ring; or a saturated ring structure with the carbonyl group in the ring. Most particularly, this invention relates to a process for condensing an aryl compound, such as toluene, with an aldehyde, such as acetaldehyde, in the presence of a catalyst, such as sulfuric acid, to obtain a diaryl paraffin such as 1,1-di-(p-tolyl)ethane. The diaryl paraffins produced in accordance with this invention can be employed as solvents, heat exchange materials, plasticizers, as intermediates to form dibasic acids, etc.

When attempts are made to condense an aryl compound with an aliphatic organic compound of the type identified above, hereinafter referred to as "aliphatic organic compound," in the presence of a catalyst, for example, an acid catalyst such as sulfuric acid, at moderate temperatures above about 5° C., preferably at a temperature of about 15° to about 60° C., the reaction generally does not result in appreciable yields of the desired diaryl paraffins but instead in the production of large amounts of undesirable decomposition, degradation and resinous products.

I have found that the desired reaction can be made to produce excellent yields of diaryl paraffins with a minimum amount of decomposition, degradation and resinous products by the relatively simple expedient of bringing the reactants simultaneously in contact with the desired amount of catalyst at temperatures above about 5° C. This can be done by combining the reactants and thereafter contacting the combined mixture with the desired amount of catalyst. Alternatively, but, preferably, each of the reactants and catalyst can separately and simultaneously be brought together at the desired reaction conditions.

In the process of this invention any aryl compound containing one or more rings, at least one of which is an aromatic ring, with at least one position open for substitution, can be employed. The rings can be condensed or can be joined together, for example, through divalent, saturated or unsaturated, substituted or unsubstituted, aliphatic groups having from one to twenty carbon atoms, derived from such compounds as methane, ethane, propane, isobutane, neopentane, heptene, 1,1,1-trichloroethane, eicosane, etc., or divalent ring structures derived from such compounds as benzene, biphenyl, toluene, xylene, naphthalene, anthracene, etc. The rings which are connected need not have the same number of carbon atoms but can vary from 5 to 8 carbon atoms. As indicated above, however, at least one of the rings must be an aromatic ring, with at least one position open for substitution. The number of rings which can be condensed or joined in each aryl compound is not critical but can be, for example, from two to ten. The aromatic rings in the aryl compound or any other rings which may be present can be substituted. However, the substituents on the aromatic ring should be such that they do not pull electrons out of the ring and thus make substitution reactions with the ring hydrogens more difficult. On the other hand, substituents which render the hydrogens on the aromatic nucleus more easily replaceable by forcing electrons into the ring can be employed. Halogens or alkyl substituents having, for example, from one to 10 carbon atoms, such as methyl, ethyl, isopropyl, heptyl, decyl, etc., can therefore be employed as substituents on the ring. Examples of aryl compounds which can be employed are benzene, toluene, xylene, mesitylene, ethylbenzene, isopropylbenzene, diisopropylbenzene, p-cymene, naphthalene, methylnaphthalene, indene, acenaphthene, anthracene, chrysene, diphenyl, dimethyl diphenyl, terphenyl, diphenylmethane, triphenylmethane, ditolylethane and dixylyloctane.

To react with the aryl compounds defined above I prefer to employ aldehydes, saturated or unsaturated, having, for example, from one to 6 carbonyl groups and from one to 30 carbon atoms, preferably from one to 18 carbon atoms. In the case of unsaturated aldehydes the double bond should be at least two carbon atoms away from a carbonyl group sought to be reacted. Aromatic aldehydes wherein the aromatic ring is directly attached to the carbonyl group sought to be reacted are unsatisfactory. Substituents which can be present on the aldehyde can be halogens, alkyl and cycloalkyl groups having from one to 16 carbon atoms, such as methyl, butyl, octyl, hexadecyl, isopropyl, isobutyl, etc., or aromatic groups such as phenyl, tolyl, mesityl, naphthyl, methyl naphthyl, anthracyl, etc. Examples of aldehydes which can be reacted with the aryl compounds previously defined are formaldehyde, acetaldehyde, propionaldehyde, butyraldehyde, isobutyraldehyde, heptaldehyde, hexadecylaldehyde, stearaldehyde, chloral, dibromoacetaldehyde, difluoropropionaldehyde, vinylacetaldehyde, formylcyclohexane, formylcyclopentane, diisoamylacetaldehyde, phenylacetaldehyde, diphenylacetaldehyde, p-chlorophenylacetaldehyde, phenyldimethylacetaldehyde, isopropylaldehyde, caprylaldehyde, glyoxal, succinic aldehyde, adipic aldehyde, sebacic aldehyde, etc. Ketones which are preferred are those having from one to 6 carbonyl groups and from three to 30 carbon atoms, preferably from three to 16 carbon atoms, for example, methylethylketone, diethylketone, diisopropylketone, di-sec-butylketone, di-tert-butylketone, dibenzylketone, methylbenzylketone, cyclopentanone, cyclohexanone, diisooctylketone, acetyl acetone, acetonyl acetone, 5,14-octadecanedione, etc.

As catalyst for the reaction between the compounds defined above any acidic compound exhibiting a strong dehydrating effect can be employed. By "strong dehydrating effect," I mean the dehydrating effect equivalent to that exhibited by sulfuric acid having a concentration of at least about 85 percent, preferably about 90 to 96 percent. Sulfuric acid of such concentration is therefore satisfactory and actually preferred. Also suitable are such acid catalysts as boron trifluoride, hydrogen fluoride, phosphoric acid, zinc chloride, etc. The strength of such acid catalysts would be at least that necessary to exhibit the dehydrating effect of the sulfuric acid defined above. For example, in the case of hydrogen fluoride, it can be employed either in aqueous solution or in its anhydrous form.

The reaction of this invention between the aryl compound and the aliphatic organic compound requires two moles of the former and one mole of the latter. One mole of the desired diaryl paraffin and one mole of water are obtained. Preferably an excess of aryl compound is employed in order to encourage the reaction to go to the right and to discourage the formation of resins which generally require considerable amounts of aliphatic organic compound. While the mole ratio of aryl compound to aliphatic organic compound can vary from about 1:100 to about 100:1 and some diaryl paraffin will be obtained, I prefer to remain within the limits of about 2.5:1 to about 5:1. Further reasons exist for employing an excess of the aryl compound in cases wherein an aryl compound such as toluene is reacted with an aldehyde usch as acetaldehyde. Toluene is less susceptible to sulfonation than the aldehyde is to polymerization and resinification, and in separating the hydrocarbon products obtained the aldehyde would be more troublesome to distill than the toluene due to its equilibrium with paraldehyde. The latter feature need not be extremely troublesome, however, since the equilibrium occurs only because of the presence of the acid media. This can be cured by neutralizing the organic layer obtained after separation.

As noted the concentration of the acid catalyst in the reaction is critical. In the event the catalyst employed has a dehydrating effect lower than that exhibited by sulfuric acid having a concentration of 85 percent, no appreciable reaction takes place. Since for each mole of diaryl paraffin obtained one mole of water is also produced, the ratios of catalyst to reactants is extremely important in order to maintain the desired concentration of catalyst. Any suitable means to insure the desired concentration can of course be employed. In general, satisfactory results will be obtained by employing at least about one mole of catalyst of desired strength per mole of aliphatic organic compound, preferably about two to about 6 moles of the former per mole of the latter.

The pressure required for the reaction is not critical and can vary from about 0 to about 200 pounds per square inch gauge. Increased pressures would permit the use of increased temperatures by maintaining the feed components in the liquid phase, but since the condensation reaction of this invention is extremely rapid, on the order of less than about 5 minutes, an increase in pressure to permit higher temperatures would serve no useful purpose. Atmospheric pressure is therefore preferred.

The temperature of the reaction is desirably above about 5° C., preferably about 15° to about 60° C. I have found, however, that if the reactants and catalyst are brought together indiscriminately within such temperature ranges no appreciable reaction leading to the desired diaryl paraffin will take place but that, instead, undesirable decomposition, degradation and resinous products will be obtained. It is therefore critical in the practice of my invention that the reactants be brought together simultaneously in contact with the catalyst medium under the reaction conditions set forth above. Thus, the reactants can be combined and thereafter the combination can be added to the catalyst medium. Preferably, the reactants and catalysts are separately and simultaneously brought together under the desired reaction conditions. Under such conditions excellent yields of diaryl paraffins are obtained and a minimum amount of decomposition, degradation and polymerization products are formed.

The recovery of the desired diaryl paraffin can be effected in any convenient manner. Thus, the reaction mixture can be sent to a settler wherein the organic layer is separated and thereafter distilled, for example, at a temperature of 100° to 350° C. and a pressure of about one mm. Hg to about one atmosphere, to remove, separately, excess reactants and the desired diaryl paraffin. Alternatively the reaction mixture can be diluted with water, separated, and the organic layer distilled under the above conditions to recover the desired compounds.

The invention can better be understood by reference to the following examples.

*Example I*

The run of the present example, as well as those following, were made in a 5-liter flask equipped with a thermometer, a stirrer, means for introducing reaction components therein and means for cooling. Into the flask was placed 25 moles of sulfuric acid having a concentration of 96 percent. Successively one mole of acetaldehyde, and two moles of toluene were added to the flask containing the sulfuric acid. The mixture was maintained at 15° C. and atmospheric pressure for 1.5 hours. The reaction mixture obtained was poured into ice water. This resulted in the precipitation of a green solid which after filtering and drying amounted to 150 grams of objectionable resin. Considerable amounts of toluene sulfonic acid dissolved in the aqueous phase are also obtained. 1,1-di-(p-tolyl)ethane was not found.

*Example II*

The run of Example I was repeated except that one mole of the aldehyde, four moles of toluene and six moles of 96 percent sulfuric acid were employed. The temperature was maintained at 30° C. and the reaction time was five minutes. Again no 1,1-di-(p-tolyl)ethane was found but instead 90 grams of a brown resin and some unreacted toluene and toluene sulfonic acid were found.

*Example III*

In this run one mole of acetaldehyde, two moles of toluene and 25 moles of sulfuric acid having a concentration of 96 percent were employed. The pressure was atmospheric, the temperature 35° C. and the reaction time one hour. Whereas in Examples I and II, the aldehyde and toluene were added successively to the sulfuric acid, in the present example toluene and aldehyde were added successively to the acid catalyst. No 1,1-di-(p-tolyl)ethane was found. Instead all of the product was water soluble indicating sulfonation of the organic material.

In the above examples, it can be seen that at elevated temperatures the desired reaction will not go regardless of the sequence in which the aryl compound and the aldehyde are added to the acid catalyst. Moreover, objectionable amounts of undesirable compounds are formed. In the examples which follow it will be shown that the desired diaryl paraffin will be obtained and a reduction of undesirable products will ensue when the aryl compound and the saturated aliphatic organic compound are added in admixture to the acid catalyst at the defined temperatures or when the reactants and the catalysts are brought together separately and simultaneously under the desired reaction conditions.

*Example IV*

Into the same reaction flask as before there was placed 6.2 moles of sulfuric acid catalyst having a concentration of 96 percent. One mole of paraldehyde (a trimer of acetaldehyde) was admixed with four moles of toluene, and the mixture was added to the sulfuric acid in the flask. The pressure was atmospheric, the temperature 25° C. and the reaction time 15 minutes. At the end of such reaction time there was recovered 141 grams of 1,1-di-(p-tolyl)ethane and 7.6 grams of high boiling material which is believed to be tetramethyl dihydroanthracene. The yield of 1,1-di-(p-tolyl)ethane obtained, based on the moles of such product theoretically possible, was therefore 67 percent.

*Example V*

In this run there was employed one mole of acetaldehyde, four moles of toluene and six moles of sulfuric acid having a concentration of 96 percent. The pressure was atmospheric, the temperature 30° C. and the reaction time five minutes. The reactants and the catalyst were simultaneously added to the reaction flask. 178.2 grams of 1,1-di-(p-tolyl)ethane, representing a yield of 85 percent, and 21.7 grams of high boiling polymer were obtained.

*Example VI*

The simultaneous addition, as in Example V, was employed using one mole of acetaldehyde, three moles of xylene and three moles of sulfuric acid having a concentration of 96 percent. Again the pressure was atmospheric, the temperature 35° C. and the reaction time 5 minutes. 130 grams of dixylyl ethane, representing a yield of 52.5 percent, and 71.3 grams of high boiling polymer were obtained.

*Example VII*

One mole of heptaldehyde was mixed with four moles of toluene and the mixture was added to six moles of sulfuric acid having a concentration of 96 percent. The pressure was atmospheric, the temperature 30° C. and the reaction time five minutes. 224 grams of ditoylyheptane, representing a yield of 80 percent, and 13.5 grams of high boiling polymer were obtained.

Although a representative number of aryl compounds, aliphatic organic compound and catalyst have been employed in the above examples, it is understood that such examples are not to be considered limiting and that comparable results will be obtained when other equivalent compounds defined herein are substituted in their place.

Obviously, many modifications and variations of the invention, as hereinabove set forth, can be made without departing from the spirit and scope thereof, and therefore, only such limitations should be imposed as are indicated in the appended claims.

I claim:

1. A process for preparing a diaryl paraffin which comprises dissolving acetaldehyde in toluene and thereafter bringing the solution obtained in contact with a catalyst selected from the group consisting of sulfuric acid having a concentration of at least 85 percent, boron trifluoride, hydrogen fluoride, phosphoric acid and zinc chloride for reaction therewith at a temperature above 5° C.

2. The process of claim 1 wherein the catalyst is sulfuric acid having a concentration of at least 85 percent.

3. A process for preparing a diaryl paraffin which comprises separately and simultaneously bringing acetaldehyde and toluene in contact with a catalyst selected from the group consisting of sulfuric acid having a concentration of at least 85 percent, boron trifluoride, hydrogen fluoride, phosphoric acid and zinc chloride for reaction therewith at a temperature above 5° C., said contact of said reactants with said catalyst being at approximately the same location.

4. The process of claim 3 wherein the catalyst is sulfuric acid having a concentration of at least 85 percent.

References Cited in the file of this patent

UNITED STATES PATENTS

| | | |
|---|---|---|
| 2,439,228 | Sturrock et al. | Apr. 6, 1948 |
| 2,610,213 | Searle | Sept. 9, 1952 |
| 2,761,884 | Koorevaar | Sept. 4, 1956 |
| 2,766,298 | Guthrie et al. | Oct. 9, 1956 |

FOREIGN PATENTS

| | | |
|---|---|---|
| 654,494 | Great Britain | June 20, 1951 |